United States Patent
Thompson et al.

(10) Patent No.: US 8,115,642 B2
(45) Date of Patent: Feb. 14, 2012

(54) TRAVELING INVISIBLE ELECTRONIC CONTAINMENT PERIMETER—METHOD AND APPARATUS

(76) Inventors: Scott R Thompson, Dickinson, ND (US); Richard Folsland, Rapid City, SD (US)

(*) Notice: Subject to any disclaimer, the term of this patent is extended or adjusted under 35 U.S.C. 154(b) by 519 days.

(21) Appl. No.: 12/247,906

(22) Filed: Oct. 8, 2008

(65) Prior Publication Data

US 2009/0102668 A1    Apr. 23, 2009

Related U.S. Application Data

(60) Provisional application No. 60/981,100, filed on Oct. 18, 2007.

(51) Int. Cl.
*G08B 23/00* (2006.01)
(52) U.S. Cl. .................... 340/573.3; 340/539.13
(58) Field of Classification Search ............... 340/573.3, 340/539.13, 988; 119/721
See application file for complete search history.

(56) References Cited

U.S. PATENT DOCUMENTS

| | | | |
|---|---|---|---|
| 5,868,100 A | 2/1999 | Marsh | |
| 5,949,350 A | 9/1999 | Girard | |
| 6,232,880 B1 | 5/2001 | Anderson et al. | |
| 6,581,546 B1 | 6/2003 | Dalland | |
| 6,700,492 B2 | 3/2004 | Touchton et al. | |
| 6,874,447 B1 | 4/2005 | Kobett | |
| 6,903,682 B1 | 6/2005 | Maddox | |
| 6,923,146 B2 | 8/2005 | Kobitz et al. | |
| 7,034,695 B2 | 4/2006 | Troxler | |
| 7,343,148 B1* | 3/2008 | O'Neil | 455/404.2 |
| 2005/0000468 A1 | 1/2005 | Giunta | |
| 2005/0034683 A1 | 2/2005 | Giunta | |
| 2005/0066912 A1* | 3/2005 | Korbitz et al. | 119/721 |
| 2006/0197672 A1 | 9/2006 | Talamas | |
| 2006/0217881 A1* | 9/2006 | Pei et al. | 701/208 |
| 2007/0204804 A1 | 9/2007 | Swanson | |
| 2008/0036610 A1 | 2/2008 | Hokuf | |

FOREIGN PATENT DOCUMENTS

| | | |
|---|---|---|
| CA | 02214238 | 8/1997 |
| EP | 1632787 A1 | 9/2005 |
| WO | WO 9801023 A3 | 1/1998 |
| WO | WO 2004114238 A2 | 12/2004 |
| WO | WO 2005034617 A1 | 4/2005 |

OTHER PUBLICATIONS http://www.compuplus.com/i-Garmin-Astro-220-Handheld-GPS-Dog-Tracking-Device-with-DC-20-dog-collar-010-00596-00-1010262~.html?sid=gpt1a17t7o4o3uf Site Accessed Oct. 8, 2008.
http://store.lionscopetproducts.com/servlet/-strse-247/RoamEO-GPS-Dog-Collar/Detail Site Accessed Oct. 8, 2008.
http://www.keenzo.com/showproductasp?M=DOG-PRODUCTS&ID=1411342&ref=GB Site Accessed Oct. 8, 2008.
http://www.discount-pet-superstore.com/GPS_dog_collars/ Site Accessed Oct. 8, 2008.
http://www.bigpawsonly.com/Geo-fencing-GPS-Collars-health.htm Site Accessed Oct. 8, 2008.

\* cited by examiner

*Primary Examiner* — Shirley Lu

(57) ABSTRACT

This invention teaches a method and apparatus that combines GPS, map overlays, a means to draw containment perimeters directly over map overlays, and a means to transmit signals to any plurality of electronic stimulus control collars to contain humans or animals within each containment perimeter. A primary aspiration of this invention is to provide hunters with a means to effortlessly operate functions of an animal stimulus collar while hunting. Novel features include a means to specify a containment perimeter that travels with the hunter by drawing the same on a on a touch sensitive graphic user interface that displays a map of the local area. This invention is easy to use and readily accepts new perimeters, perimeter alterations, or a multiple of perimeters at will.

8 Claims, 10 Drawing Sheets

TRAVELING INVISIBLE ELECTRONIC CONTAINMENT PERIMETER—METHOD AND APPARATUS

CROSS REFERENCE TO RELATED APPLICATIONS

This application claims the benefit of priority under 35 U.S.C. 119(e) to provisional application No. 60/981,100 Filed Oct. 18, 2007 and titled "Portable Invisible Perimeter Fence for Animal Control—Method and Apparatus". This application is related to U.S. patent application Ser. No. 12/239,740, filed Sep. 27, 2008 and titled "Voice Controlled Stimulus Collar—Method and Apparatus", which claims the benefit of priority under 35 U.S.C. 119(e) to provisional application No. 60/975,516 Filed Sep. 27, 2007 and titled "Voice Controlled Dog Hunting and Training—Method and Apparatus"; all of which are incorporated herein by reference.

STATEMENT REGARDING FEDERALLY SPONSORED RESEARCH

None

FIELD OF THE INVENTION

This invention relates to hands-free control of human and animal borne stimulus collars used for control, containment, and training thereof.

BACKGROUND OF THE INVENTION

Use of stimulus collars to train and control animal behavior dates back nearly three-quarters of a century to the teachings of U.S. Pat. No. 2,023,950 in 1935 by Carter. Twenty-one years later Putnam unveiled a sound activated stimulus collar to control dog barking in U.S. Pat. No. 2,741,224. Pettingill introduced a similar device 5 years later in 1961 under U.S. Pat. No. 2,996,043. One of the first radio controlled stimulus collars was introduced by Cameron in 1957 under U.S. Pat. No. 2,800,104. U.S. Pat. No. 3,589,337 subsequently taught an improved radio controlled dog collar in 1971 that provides increased shock intensity for insensitive animals or when the collar battery attenuates.

Since that time, improvements to accurate control, effective range, battery life, and simultaneous operation of multiple stimulus collars have advanced the technology. For example Tobias teaches a means to deliver voice commands directly to an animal collar in U.S. Pat. No. 4,967,696. Kim extends battery longevity by teaching a transmitter that automates signal duration in U.S. Pat. No. 6,598,563. McFarland teaches forward error correction to increase the effective range of accurate collar control in US Patent application 20070181078. Recent disclosures like US Patent application 20070056526 teach methods to find collar control transmitters that are lost in the field. Other illustrative embodiments of animal training and hunting collars are described in U.S. Pat. Nos. 7,046,152, 5,934,225, 7,068,174, and 6,874,447 and in US Patent Application Publication 20070181078.

Considerable attention is given to automated control of animal stimulus collars in prior art. Early variations of automated control employed sound activation as illustrated in U.S. Pat. No. 2,741,224. The teachings of U.S. Pat. Nos. 7,421,979, 6,575,120, and US Patent Applications 20060226994 and 20040239507 employ buried wires that serve as containment barriers of an invisible fence to control animal stimuli. RF and acoustic Range Collars like those taught by U.S. Pat. Nos. 5,769,032, 6,191,693, 6,542,080, 6,825,768, 6,961,001, 6,874,447, 6,879,300, 7,046,152 and 7,173,535 and US Patent applications 20010040508 and 20070096929 advanced the technology by eliminating the need to bury conductive loop wires around the containment perimeter.

Recent prior art is directed toward autonomous animal containment and control that relies in part on GPS. A sample embodiment of GPS controlled animal stimuli was introduced in 1999 by Marsh under U.S. Pat. No. 5,868,100 and WO9801023 to control grazing animals. Marsh and other teachings including U.S. Pat. Nos. 6,271,757, 604,374, 6,232,880, 6,232,916, 6,342,847, 6,923,146, 6,700,492, 5,949,350, and 7,034,695. US Patent Application 20060197672, and international patents WO 2005034617 A1, WO 2004114238 A2, EP 1632787 A1, CA 02214238, and WO 9801023 A3 use transmitters and other key-in style devices to establish GPS coordinates that make up vertices of a containment boundary that is stored on a computer or other electronic device. Variations of these prior art teach means to stimulate animals with vibratory, electrostatic, acoustic commands, right-left coordinated sound, and praising responses to control animal behavior. Schmitt teaches a GPS fence and an ultrasonic link to contain groups of animals in U.S. Pat. No. 6,956,483. US Patent Application 20080036610 by Hokuf teaches an animal tracking unit that sends GPS tracking info back to an external device such as a portable navigation unit that displays animal location.

BRIEF DESCRIPTION OF THE INVENTION

In spite of the foregoing, prior art and the literature fail to teach a user friendly means to define containment zones by effectively drawing perimeter boundaries over a graphic representation of the surrounding area. The present invention addresses this deficiency by teaching a means to use a pointing device to specify containment zones for stimulus collars by effectively drawing them onto a graphical user interface. This invention is easier to use than prior art and readily accepts new perimeters, perimeter alterations, or a multiple of perimeters at will. This invention is able to simultaneously operate a plurality of sub and primary containment perimeters as well as a plurality of stimulus collars.

The resulting invisible fence improves prior art by allowing an operator to specify or alter containment zones on-site without having to traverse portions or vertices of the desired perimeter boundaries. This invention also eliminates the need to specify, store, or download containment zones in advance of use. A novel feature of the present invention is that any plurality of the established perimeters can be selected to follow a moving base unit.

The invention may be used to contain humans or animals to specific mobile or stationary zones and is well suited for controlling pets in public areas. The device is also useful for traveling pet owners that visit parks or rest stops where pets are restricted to specific areas. Moreover, the perimeter fence can be used to contain an animal to a specific pattern near the owner so that the animal does not run away. This is useful for older or disabled pet owners that can't chase a running pet. This invention is also well suited for home and industrial animal containment.

A principal motivation for this invention is to enable distraction-free control of a plurality of dogs during a hunt as illustrated in FIG. 1. By simply drawing in a containment perimeter on the device before a hunt, a hunter can focus entirely on a hunt rather than on control of a hunting dog. The present invention thereby eliminates the need to constantly monitor and control dogs during a hunt.

DESCRIPTION OF THE DRAWINGS

Further features, advantages, and benefits of this invention, as well as the structure and operation of various embodiments thereof, are described in detail below with reference to the accompanying drawings. In the drawings, like reference numbers generally indicate identical, functionally similar, and/or structurally similar elements. The drawing in which an element first appears is indicated by the leftmost digits in the corresponding reference number. A number of applications exist for the present invention and the drawings disclosed herein are illustrative of preferred and sample embodiments of the disclosed invention and are not intended to limit the spirit or scope thereof.

DETAILED DESCRIPTION OF PREFERRED EMBODIMENTS

Figure 1:
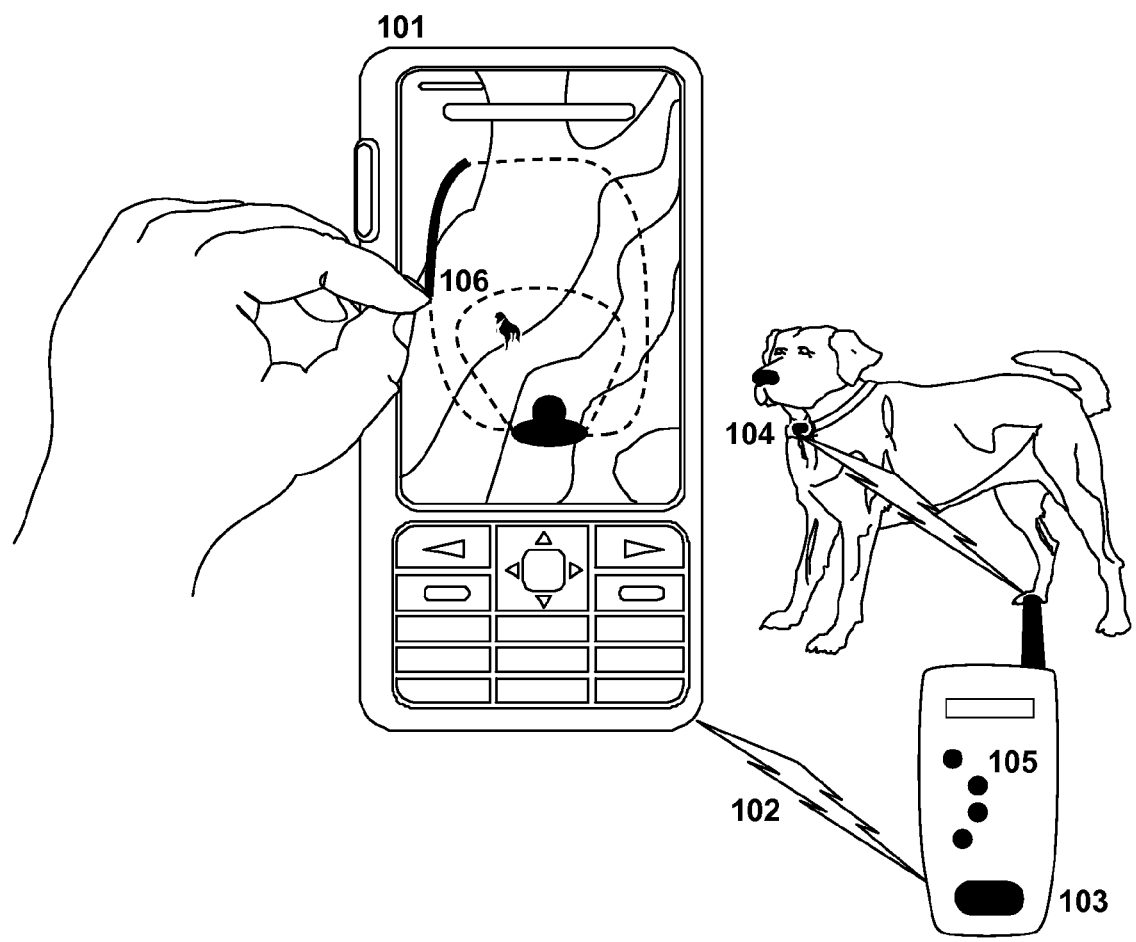
FIG. 1 shows an embodiment of the present invention that uses integrated Bluetooth from a cell phone or PDA to communicate functions to a wireless stimulus collar control transmitter, which relays the same to a dog.
Figure 2:
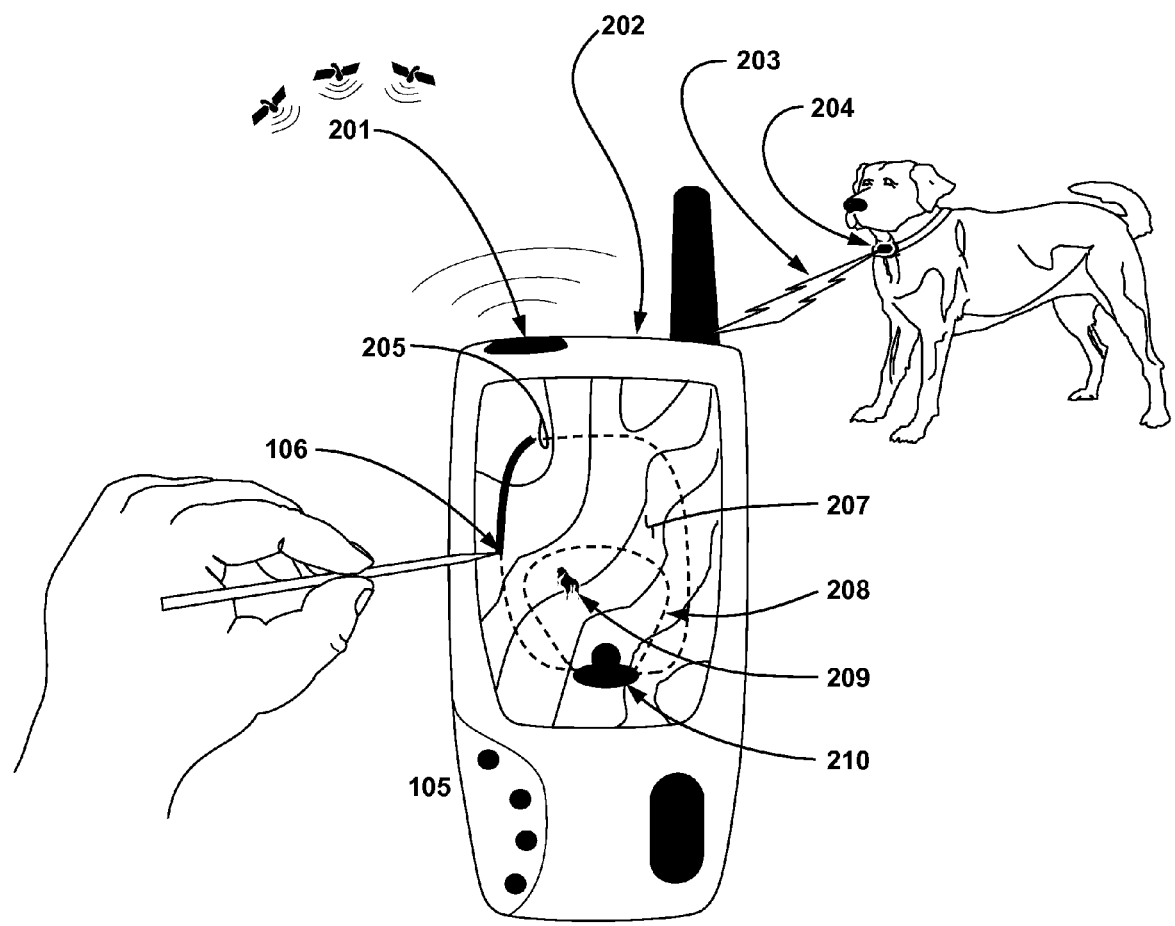
FIG. 2 illustrates a preferred method and apparatus of the present invention to define a containment perimeter and use the same to control stimulus functions on a dog collar.

This invention teaches a methods and apparatuses that combine ways to track and contain humans or animals with conventional and evolving stimulus collars that are affixed to a human or animal and used for training, control, and communication thereof. Among the many benefits of this invention is that it provides an improvement to conventional handheld operation of dog collars.

The term "collar" is used herein to describe a human or animal borne device that provides stimulus that is readily detected by the wearer. Examples thereof include electrostatic shock, acoustic stimulus, mist or vapor stimulus, buzzers, voice relay, vibration, light, and other means of stimulus that are used to communicate or to control behavior. The term collar herein also refers to any device that is affixed to the wearer and preferably to the body or neck region thereof.

The term "main control unit" is used herein to describe a processor or device that provides the primary computation and control functions of this invention. The device is preferably a belt-clipped or other human borne apparatus. Examples thereof include portable data assistants (PDA), cell phones, dedicated portable electronic devices, embedded controllers, FPGA or ASIC chips, and other devices with sufficient processing capability to perform the operations and functions of this invention. Other examples include computers and preferably portable notebook PCs.

The term "pointing device" is used herein to describe components that are commonly used to enter information into a computer including those commonly known to one skilled in the art such as a touch-screen, computer mouse, digital pen, digital table, or other pointing device.

Embodiments of this invention combine GPS 201 or other tracking methods with a main control unit 101, 202, 305, 609 to autonomously transmit signals 203 that control functions on a plurality of animal stimulus collars 204. Preferred embodiments accept animal containment perimeter 205 input from a touch sensitive screen wherein said perimeter 205 is established by drawing the same 106 over a background map of the area 207. Some main control units may include switches 105 to manually operate functions of the stimulus collar.

A principal novelty of the present invention is the use of containment perimeters that are drawn 106 over a graphic representation of the surrounding area 207, regardless of the method used to draw each perimeter. Select embodiments capture pointer movements and compare the resulting drawn perimeter 106 pixel by pixel to the corresponding location of map contours on the display 207 to calculate the desired zone boundaries 205, 208, 301, 302. It is also possible to use methods including curve fitting, vectors, and other means to convert perimeters that are operator drawn 106 into comparison zones 205, 208, 301, 302 to improve performance of this invention.

At the time of filing, background maps provided by Google Earth, Google Maps, MapQuest, and Yahoo Maps were suitable for use as background maps in the present invention. Other similar background maps or electronic generated images of the area 304 are suitable. Users are able to draw and use nested smaller perimeters 208 that are a subset of larger perimeters 205 in preferred embodiments. Optimal embodiments of this invention superimpose iconic symbols 210 or real images over the background map 207 to depict the location of each animal or stimulus collar as well as the location of the main control unit 101, 202, 305, 609. Symbols representative of a human 211 are preferably used when this invention is used to assist a hunt.

Figure 3:
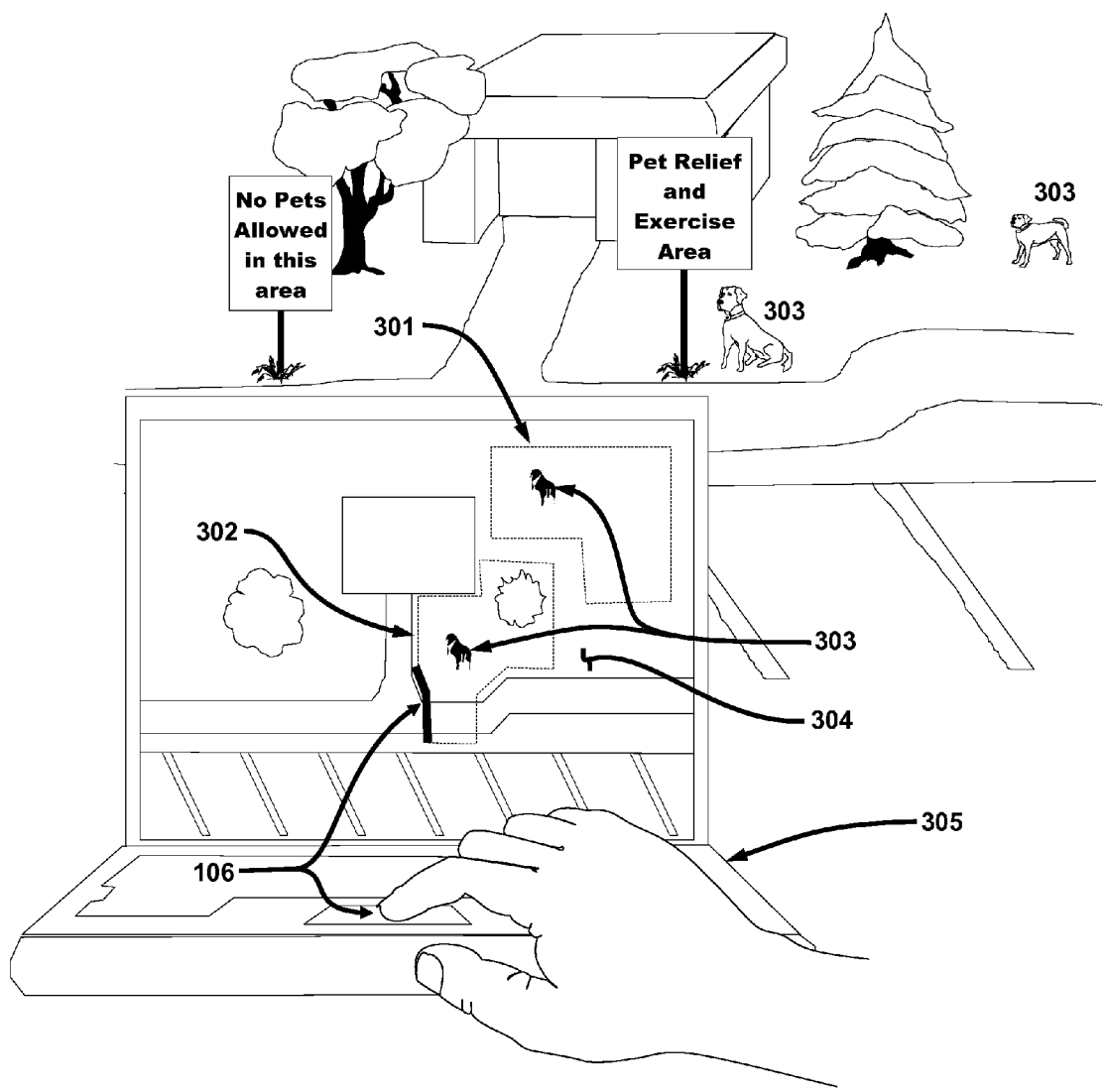
FIG. 3 illustrates a notebook PC embodiment of this invention that is used to define separate invisible fences to control individual dogs in a public area.
Figure 4:
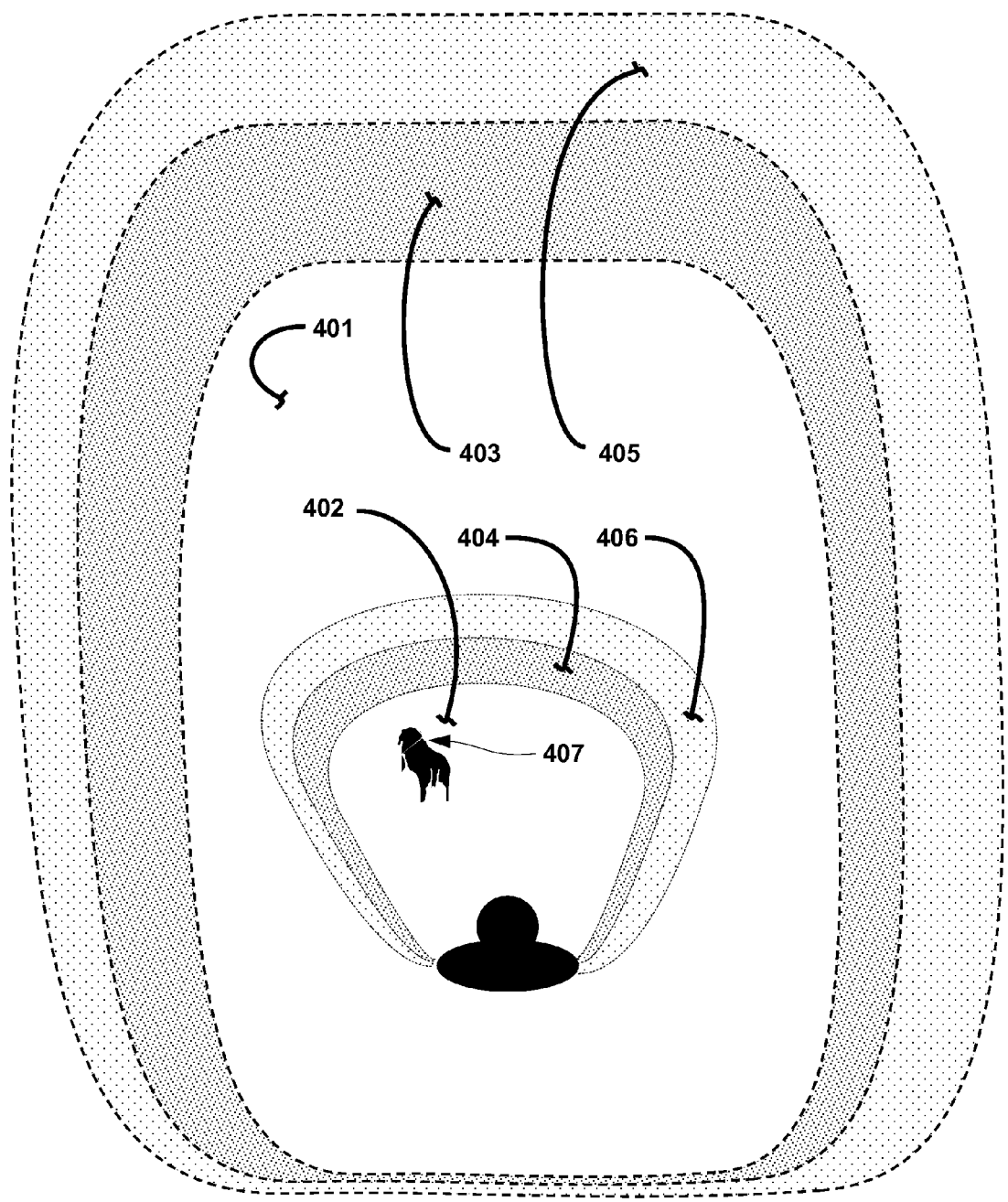
FIG. 4 illustrates a plurality of moving and stationary containment zones used as thresholds to autonomously trigger warning and corrective functions of an animal stimulus collar.
Figure 5:
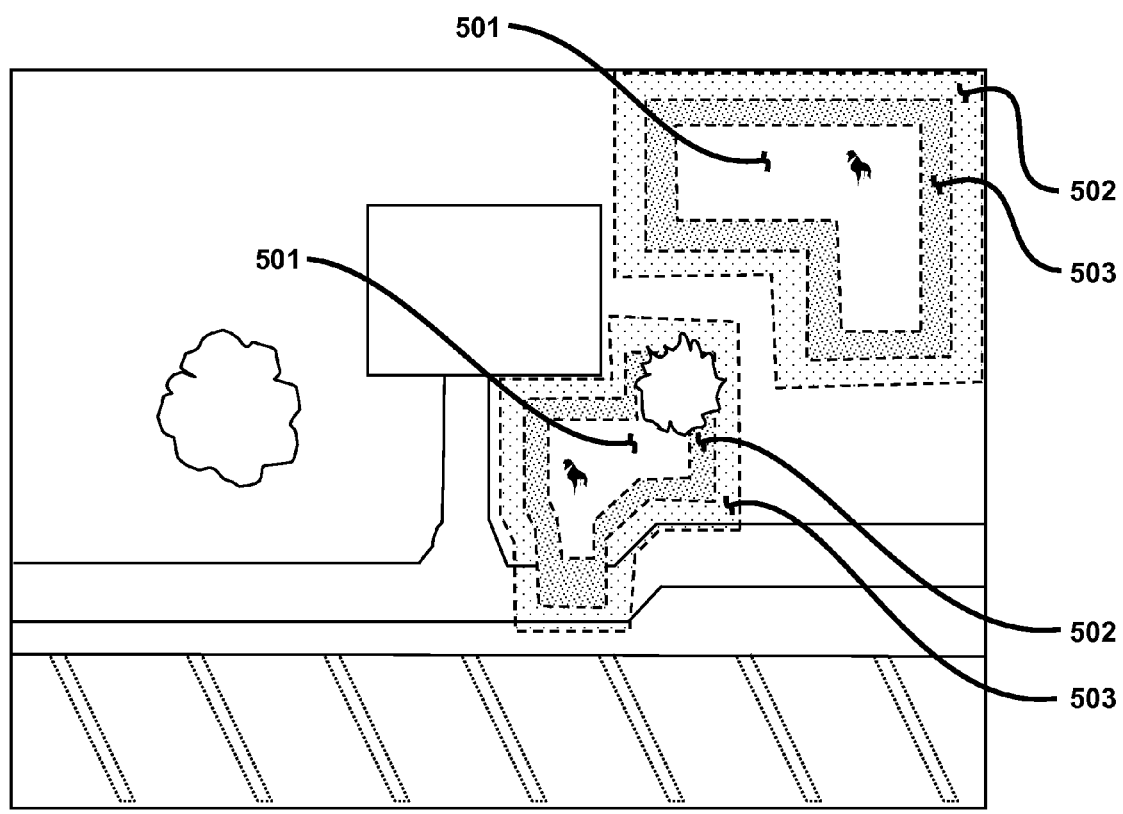
FIG. 5 illustrates a plurality of safe, encroachment, and restrictive containment zones used as thresholds to autonomously trigger various warning and corrective functions of an animal stimulus collar.
Figure 6:
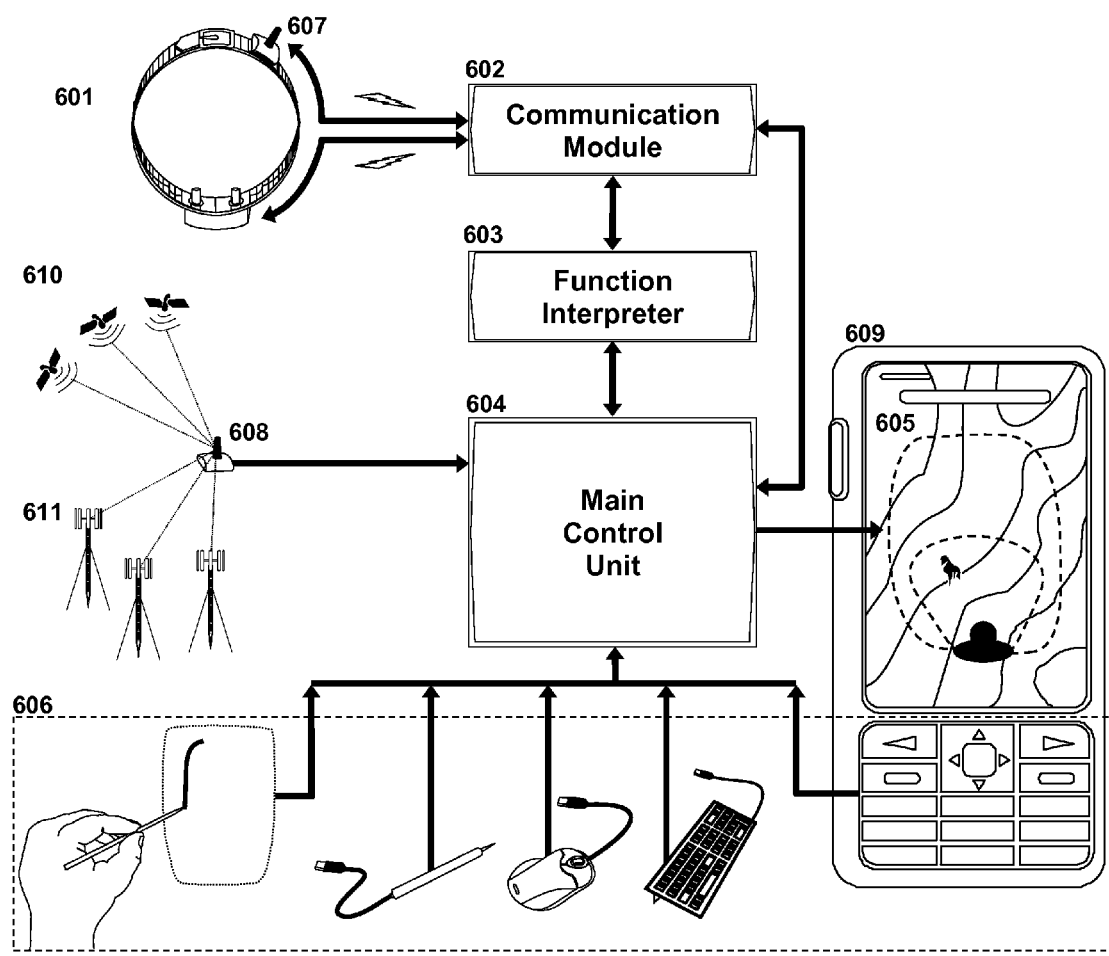
FIG. 6 is a block diagram a preferred apparatus of the present invention.

Referring now to FIG. 3, this invention provides a plurality of containment regions 301, 302 and is able to jointly or separately contain a plurality of animals 303 within any combination of invisible fences desired by the user. Notice that the embodiment in FIG. 3 illustrates a background map 304 depicted on a standard computer interface 305, which functions as a main control unit. Background map information is preferably stored on the main control unit and is alternatively field downloadable as needed.

Containment perimeters 205, 208, 301, 302 in PDA 202, laptop 305, smart or GPS based cell phone 609, computer, and other embodiments of the present invention are selectable by clicking boundary vertices or drawing desired perimeters 106 with a pointing device 606, loading predefined perimeter files, keying or typing in desired perimeter files, or any other means of data entry that interfaces to the main control unit.

It is advantageous to use features of existing devices to minimize the burden of constructing this invention. Accordingly, Bluetooth links 102 are a preferable means in some embodiments to deliver stimulus commands to relay transmitters, which then forward the instructions to a plurality of stimulus collars.

Like prior art, this invention includes a plurality of containment zones that trigger various functions of the stimulus collar. For example a plurality of safe zones 401, 402, 501 trigger praise stimulus or will not trigger alarm functions on the collar 407. By contrast, a plurality of encroachment zones 403, 404, 502 trigger warning functions on the collar 407, while a plurality of restricted zones 405, 406, 503 trigger corrective functions on the collar 407. Other zones may be defined and used with this invention to control functions on the stimulus collar. As previously noted, this invention provides simultaneous operation of a plurality of separate mobile 402, 404, 406 and stationary 401, 403, 405, 501, 502, 503 containment zones.

Embodiments of Preferred Apparatus

Various components of the preferred apparatus include a stimulus collar 601, communication link 602, function command interpreter 603, main control unit 604, graphic user interface 605, human interface for data entry 606, a plurality of locators on each wearer placed preferably on the collar 607 and at least one locator coupled to the main control unit 608. The main control unit 604 comprises preferably a computer, PDA, smart phone, embedded controller, or dedicated control electronics. While select embodiments use a keyboard, computer mouse, digital pen, digital table, or other pointing device as the human interface 606; a touch-screen is preferred.

Preferred communication link 603 embodiments use bi-directional wireless means to communicate location, stimulus collar command, and other data between the remote unit and individual stimulus collars. Bi-directional communication of function commands is generally not required unless error correction is used to improve stimulus collar performance. Preferred computer 305, cell phone 102, 609, and PDA embodiments use Bluetooth, packet based, or other protocols to improve performance. Spread spectrum techniques may also improve wireless performance.

Select embodiments employ a function command interpreter 603 to convert output from the main control unit 602 into signals that are usable by the stimulus collar 601. The command interpreter 609 is particularly useful when this invention is provided as an upgrade to an existing collar. When used with the present invention, the command interpreter serves as a bridge between the main control unit 602 and the communication module 603. Not all embodiments of this invention require the function command interpreter 603.

Various embodiments use combinations of GPS 610 or cellular telephone triangulation 611 to provide location for the main unit 608. Select embodiments use the same 610, 611 to provide location of each stimulus collar; however alternative means including local RF triangulation to locate each collar will work with this invention. Other embodiments rely on differential tracking and GPS positioning located either on the stimulus control collar or on the remote unit to provide location. CDMA and GMS cellular phones 609 are preferably used to provide location in some embodiments. Other embodiments use GPS 201 that is integrated into PDA, portable computer 305, or other electronic devices.

Embodiments of the Preferred Method

This invention employs various methods, some discussed below, to determine if a given animal is within a specific plurality of zones and sends appropriate functions to a stimulus collar worn by the animal.

Figure 7:
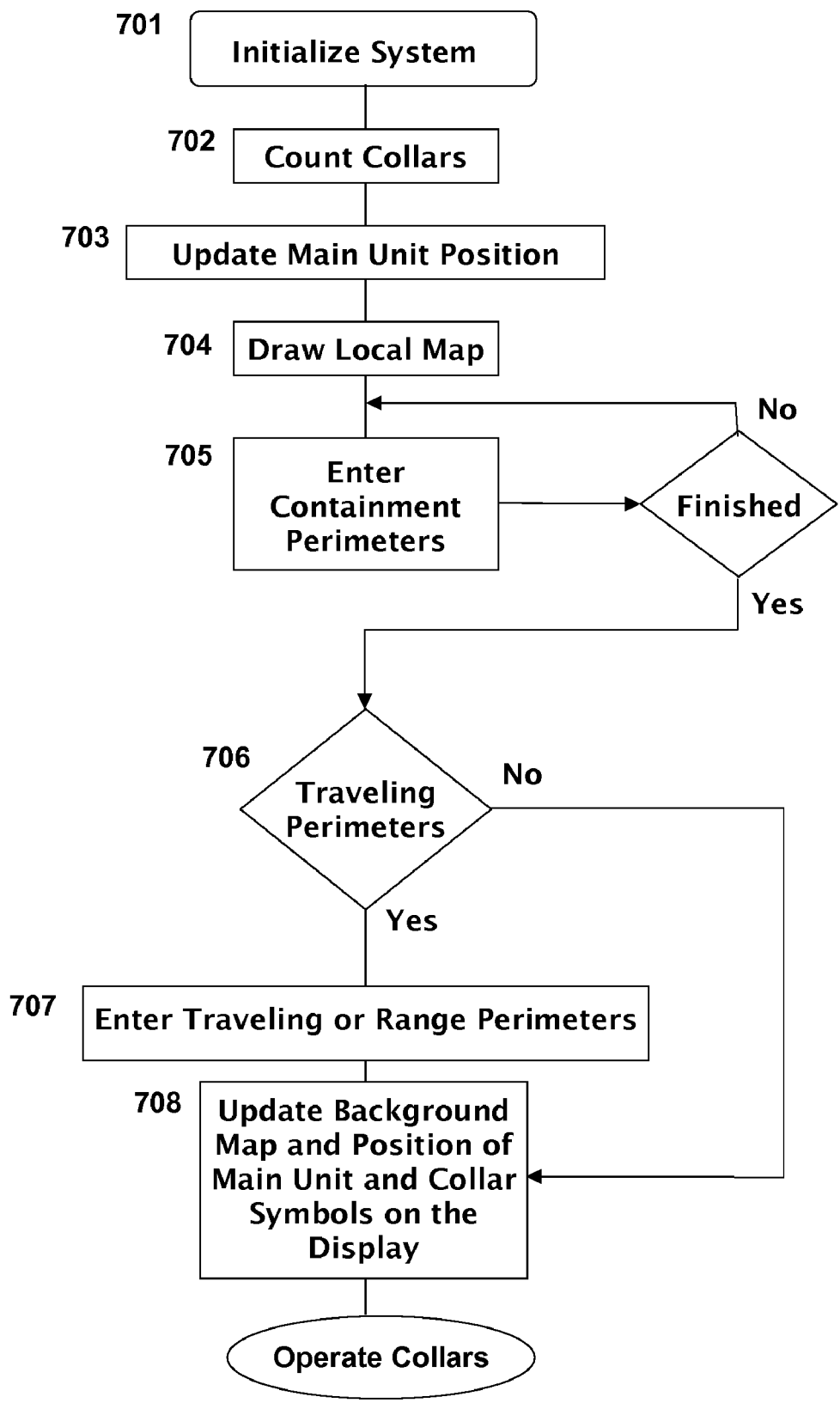
FIG. 7 is a flow chart of the preferred initialization method of this invention.
Figure 8:
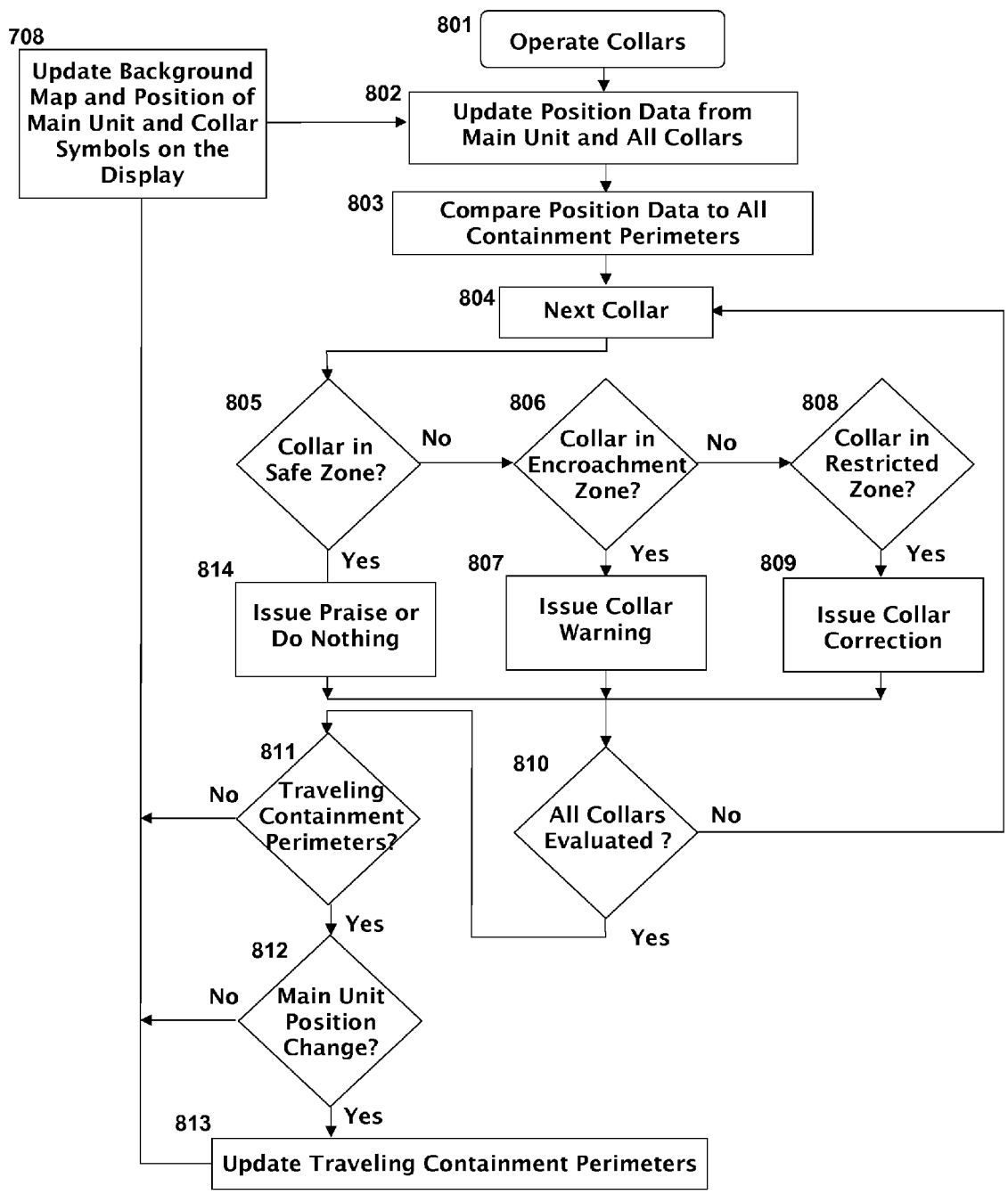
FIG. 8 is a flow chart of the preferred method to implement this invention in an infinite loop.

A flow-chart of a preferred method is shown in FIG. 7 and starts by initializing the system 701. The system or the end-user determines the number of stimulus collars in use 702 and subsequently obtains accurate geolocation of the main unit from GPS, cell phone triangulation, wireless triangulation, or other methods 703. A local map of the area is subsequently drawn 704 on the display and the end user is prompted to draw or enter containment perimeters over the map 705. Before entering an infinite loop to update collar position and send appropriate commands to each collar, the operator is prompted 706 for the option of entering or selecting traveling perimeters 707 that automatically move with the transmitter and properly positioned icons of each stimulus collar and the main control unit are drawn in the display 708.

In the preferred embodiment, the following steps are repeated in an infinite loop 801. Each iteration starts by updating position data of the main unit and all stimulus collars 802. The position of each collar is compared to the outer perimeter of each containment perimeter 803 before a decision is made to send a specific function to each collar 804. As previously noted, a plurality of containment zones 805, 806, 807 are used as thresholds to determine which functions 814, 808, 809 are activated. The process is repeated for each stimulus collar in use 810. If traveling containment perimeters are in use 811 and the position of the main unit has changed 812 since the last iteration, the perimeter boundaries of each traveling perimeter is updated 813. The position of each collar and the position of the main control unit are updated on the display as is the background map during each iteration 708.

Sample Uses of the Present Invention

Figure 9:
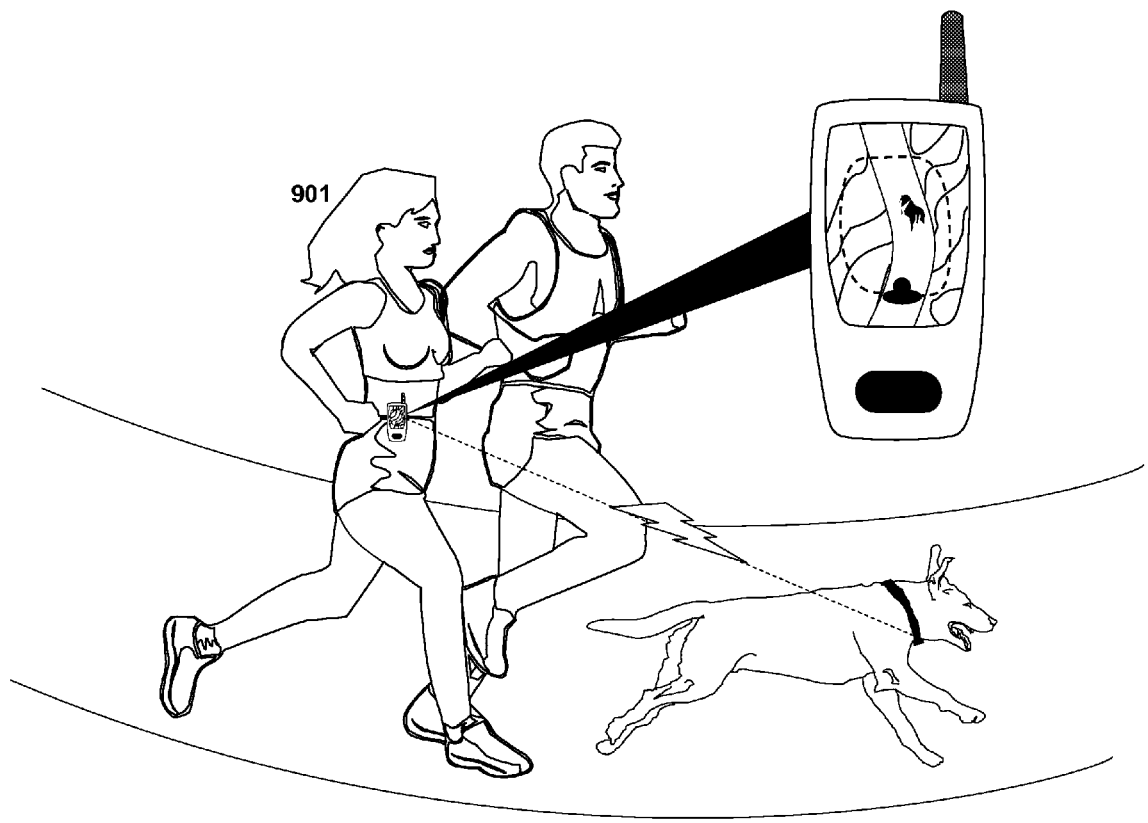
FIG. 9 illustrates a belt-worn embodiment of the present invention used to exercise with a dog.

Another preferred method is to use this invention to contain pets in public areas as illustrated in FIG. 3. The example shows a pet owner drawing 106 containment perimeters 301, 302 for two separate dogs 303 over a map of a public rest stop. Properly trained dogs equipped with a stimulus collar that is controlled by this invention will remain in separate areas representative of perimeters that were drawn using a pointing device on the computer 305. This invention is also well suited for use as a traveling electronic leash while walking, playing, and exercising 901 with pets as illustrated in FIG. 9.

Figure 10:
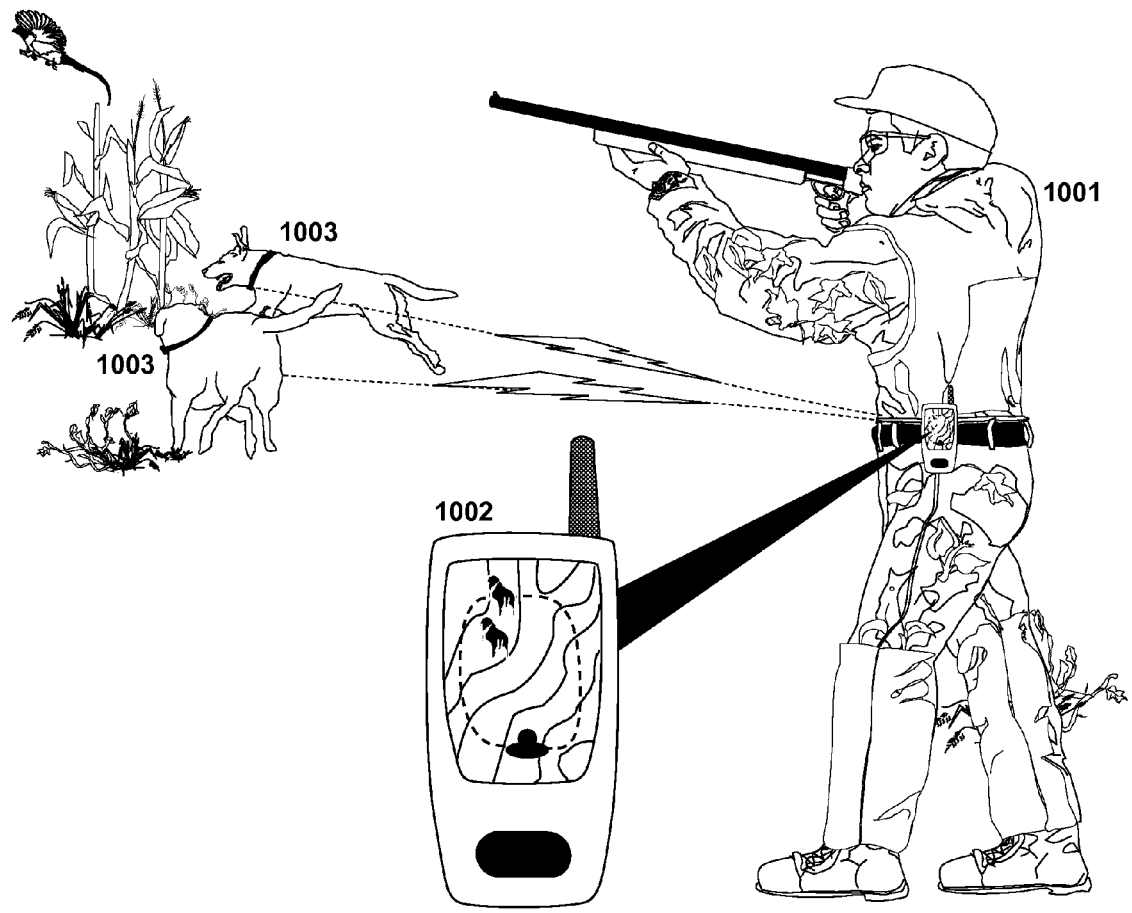
FIG. 10 illustrates a belt-worn embodiment of the present invention in use during a bird hunt.

A hunter 1001 equipped with an embodiment of this invention 1002 is able to operate stimulus collars 601 on a plurality of trained hunting dogs 1003. The example in FIG. 10 shows that a hunter 1001 using this invention 1002 is able to keep his hands on a shotgun while remaining focused on the hunt. This invention obviates the need to reach for a conventional collar transmitter if either dog 1003 is flushing to far ahead and makes it easier to hunt with more than one dog.

It is understood that the above embodiments and applications are merely illustrative of the possible specific applications which may represent principles of the present invention. Other arrangements may readily be devised in accordance with the principals herein by those skilled in the art without departing from the scope and spirit of this invention.

We claim:

1. A stimulus collar tracking and control apparatus that compares the position of a plurality of stimulus collars to a plurality of containment zones and provides commands to activate functions of said plurality of stimulus collars based on said plurality of stimulus collar positions relative to said plurality of containment zones and comprises in combination:
   (a) a hand portable command module comprising a graphic user interface, a touch screen interface, an electronic means to determine current geolocation of said stimulus collars and said hand portable command module with or without GPS, hardware and software that retrieves and updates background maps relative to current geolocation of said stimulus collars and said hand portable command module, and a function interpreter that selects stimulus commands to send to individual collar units, (b) an electronic means to enter boundaries representative of said containment zones by drawing said containment zones over said background maps into said graphic user interface using said touch screen interface, (c) an electronic means to determine the location of said primary control unit, (d) an electronic means to determine the location of said plurality of stimulus collars, (e) an electronic means to execute comparison of said plurality of stimulus collar positions to said containment zone perimeters, (f) an electronic means to use said plurality of stimulus collar positions as a basis to cause activation of functions of said plurality of stimulus collars, (g) a wireless means to transmit said stimulus commands to said individual collar units, (h) a plurality of stimulus collar units that receives said stimulus commands, (i) a combined software and hardware means to initialize said hand portable command module comprising minimally of the steps of identifying, electronically pairing, geolocating, and counting said stimulus collars, obtaining said geolocation, displaying said map representative of said geolocation, and displaying properly positioned iconic images of said stimulus collars over said map representative of said geolocation of each said stimulus collar, (j) a combined software and hardware means to accept user input from said touchscreen to define a plurality of fixed containment zones, (k) a combined software and hardware means to accept user input from said touchscreen to define a plurality of traveling containment zones, (l) a combined software and hardware means to display said containment zones and plurality zones properly positioned over said background map representative of geolocation of said pluralities of fixed and traveling containment zones, (m) a combined software and hardware means to implement a loop that periodically updates said graphic user interface display of said background map, said pluralities of fixed and traveling containment zones, and said iconic images of said plurality of stimulus collars, (n) a combined software and hardware means in said function interpreter to implement a comparison loop that periodically updates geolocation of said hand control module and said plurality of stimulus collars, and compares geolocation of said plurality of stimulus collars relative to said pluralities of fixed and traveling containment zones, (o) a combined software and hardware means to implement a selection function within said comparison loop that selects a warning command for each said stimulus collar that is geolocated in an encroachment zone, a correction command for each stimulus collar that is geolocated outside of every said plurality of fixed containment zones and traveling containment zones, (n) a combined software and hardware means to implement a wireless transmitting instruction within said selection function loop to convey said warning command selected therein to each said stimulus collar, (p) each said stimulus collar receives said transmitting instruction and implements each said warning command without having to receive GPS data.

2. An apparatus of claim 1 that further comprises an alternative electronic pointing means to draw said boundaries representative of said containment zones when a touch screen is not present or is not functioning.

3. An apparatus of claim 1 that further comprises a function command interpreter to convert output from the said apparatus of claim 1 into signals that are usable by a plurality of existing stimulus collars.

4. A method to track and contain humans or animals with stimulus collars that comprises in combination:

(a) obtaining accurate geolocation of a handheld portable command module with our without integrated GPS having a touch-screen interface and having a capability to display maps relative to said current geolocation, (b) causing said handheld portable command module to draw said map representative of said geolocation, (c) using said touchscreen to enter a plurality of containment zones by drawing perimeters thereof over said background map, (d) obtaining the location of a plurality of stimulus collars that receive stimulus commands without needing to receive GPS data, (e) displaying properly positioned icons representative of each stimulus collar, main control, and containment zone, (f) comparing the position of each stimulus collar to the outer perimeter of each said containment zone and using said comparison to select a specific function activation for each said stimulus collar, (g) using a wireless means to transmit said selected specific function activation commands to each said stimulus collar, (i) initializing said hand portable command module by minimally executing the steps of identifying, electronically pairing, geolocating, and counting said stimulus collars, obtaining said geolocation, displaying said map representative of said geolocation, and displaying properly positioned iconic images of said stimulus collars over said map representative of said geolocation of each said stimulus collar, (j) accepting user input from said touchscreen to define said plurality of fixed containment zones, (k) accepting user input from said touchscreen to define a plurality of traveling containment zones, (l) displaying said containment zones and plurality zones over said background map representative of geolocation of said pluralities of fixed and traveling containment zones, (m) periodically updating said graphic user interface display of said background map, said pluralities of fixed and traveling containment zones, and said iconic images of said plurality of stimulus collars, (n) continuously updating the geolocation of said hand control module and said plurality of stimulus collars, and comparing the geolocation of said plurality of stimulus collars relative to said pluralities of fixed and traveling containment zones, (o) selecting a warning command for each said stimulus collar that is geolocated in an encroachment zone, a correction command for each stimulus collar that is geolocated outside of every said plurality of fixed containment zones and traveling containment zones.

5. A method of claim 4 that further comprises associating a plurality of stimulus collar activation functions with said plurality of containment zones.

6. A method of claim 4 that further comprises using a pointing device to enter said boundaries representative of said containment zones.

7. A method of claim 4 that further comprises moving a plurality of said containment zones relative to the operator of said main controller.

8. A method of claim 4 that further comprises moving a plurality of said containment zones relative to a plurality of components of said main controller.

* * * * *